United States Patent [19]

Varaney

[11] 4,155,192
[45] May 22, 1979

[54] FISHING LURE

[76] Inventor: John A. Varaney, 23 Overton Ave., Milford, Conn. 06460

[21] Appl. No.: 821,789

[22] Filed: Aug. 4, 1977

[51] Int. Cl.² ............................................. A01K 85/00
[52] U.S. Cl. ...................................... 43/42.32; 43/42.5
[58] Field of Search .................. 43/42.32, 42.33, 42.34, 43/42.5

[56] References Cited

U.S. PATENT DOCUMENTS

| 1,300,149 | 4/1919 | Evans | 43/42.34 |
| 1,805,416 | 5/1931 | Raymond | 43/42.32 |
| 2,698,494 | 1/1955 | Larsen | 43/42.5 |
| 2,748,523 | 6/1956 | McNabb | 43/42.5 |
| 2,787,860 | 4/1957 | Carr | 43/42.5 |
| 3,673,727 | 7/1972 | Bauer | 43/42.5 |

Primary Examiner—Harold D. Whitehead
Attorney, Agent, or Firm—Mattern, Ware, Davis & Stoltz

[57] ABSTRACT

By providing a deep drawn substantially V-shaped body longitudinally tapering from front to rear with an upwardly extending head and tail portion, the unique construction is achieved capable of simulating the undulating, rolling, wagging, zig-zagging motion of a wounded bait fish moving through the water. In the preferred embodiment, the V-shaped body cooperates with a plurality of form-fitting lead weights, each having a different mass, in order to effectively achieve a plurality of different weighted lures using a single fishing lure body and a variety of replaceable weights.

20 Claims, 10 Drawing Figures

U.S. Patent | May 22, 1979 | 4,155,192
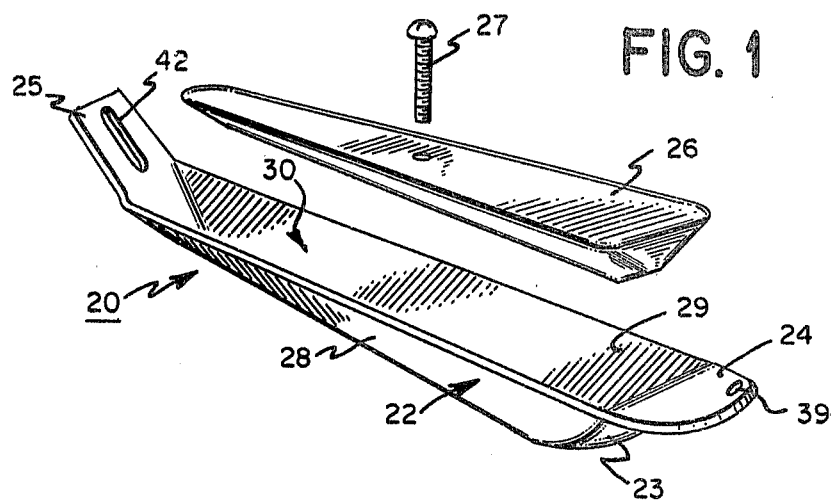
FIG. 1
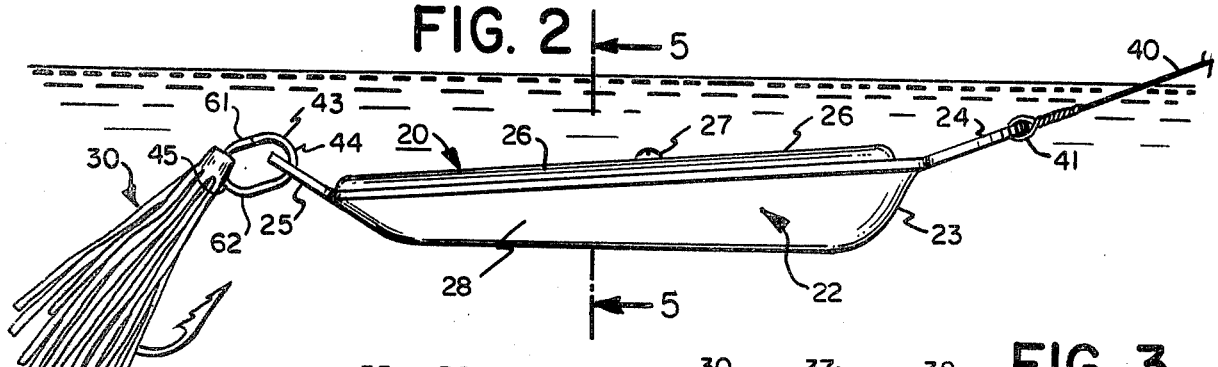
FIG. 2
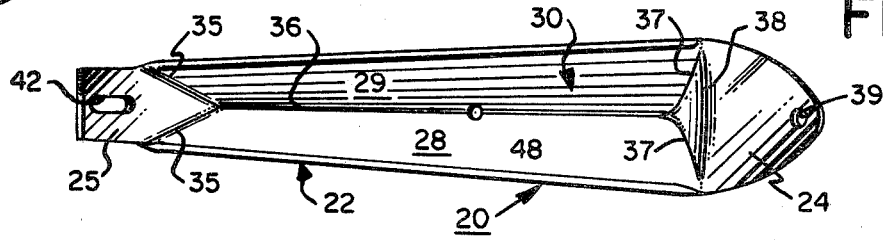
FIG. 3
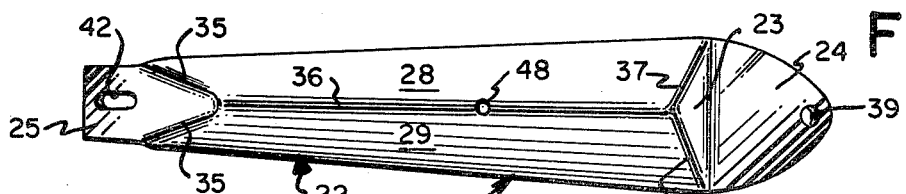
FIG. 4
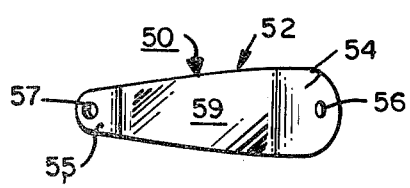
FIG. 5  FIG. 6  FIG. 7
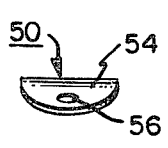
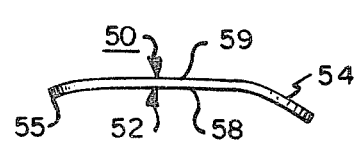
FIG. 8  FIG. 9  FIG. 10

FISHING LURE

BACKGROUND OF THE INVENTION

The present invention relates to fishing lures, and more particularly to a fishing lure which closely simulates wounded bait fish in its general appearance and in its movement when the lure is drawn through the water.

Throughout the years, many prior art fishing lures have been developed in order to achieve various configurations and actions which are believed to attract the sought after game fish. The best known prior art fishing lure, of the type of the present invention, is disclosed in U.S. Pat. No. 3,641,698, issued on Feb. 15, 1972, to John A. Varaney. In this prior art patent, a one-piece fish simulating fishing lure is disclosed comprising an elongated solid body. It has been found that this particular construction, while providing a portion of the action achieved by the fishing lure of the present invention, is incapable of successfully accommodating the variety of different situations encountered by a fisherman.

The major drawback of this particular prior art fishing lure, as well as all of the prior art fishing lures, is the fact that the lure has a specific mass and can be employed under only certain water conditions, specific depths, or for specific fishing methods. Consequently, a different size fishing lure must be employed for each potential situation the fisherman may encounter, as well as the various water depths in which the fisherman may desire to attempt.

Furthermore, prior art fishing lures generally require sinkers to maintain the fishing lure at the desired water depth. However, the use of sinkers impedes the natural action of the fishing lure and reduces its efficacy in attracting the desired game fish.

Therefore, it is a principal object of the present invention to provide a fishing lure capable of achieving the rolling, wagging, undulating, zig-zagging movement of a swimming bait fish, in general, and more particularly the characteristic continuous half rolling motion of a wounded bait fish.

Another object of the present invention is to provide a live bait fish simulating fishing lure having the characteristic features defined above which can be used at virtually any desired water depth under any desired fishing conditions and substantially eliminates the need for line-mounted sinkers.

Another object of the present invention is to provide a live bait fish simulating fishing lure having the characteristic features defined above which is capable of accommodating any one of a plurality of weights as a portion of the lure itself.

A further object of the present invention is to provide the live bait fish simulating fishing lure having the characteristic features defined above which produces a highly visible repeated flashing as the lure rolls from side to side.

Another object of the present invention is to provide a live bait fish simulating fishing lure having the characteristic features defined above which resist both sinking and planing when the fishing lure is drawn through the water.

Another object of the present invention is to provide a live bait fish simulating fishing lure having the characteristic features defined above which is capable of employing a single size and length for use in fishing for medium to large size game fish, as well as all types of fishing.

Other and more specific objects will in part be obvious and will in part appear hereinafter.

SUMMARY OF THE INVENTION

The fishing lure of the present invention establishes a single, multi-purpose, universally applicable fishing lure capable of simulating the undulating, rolling, wagging movements of a bait fish and the side-to-side zig-zag rolling action of a wounded bait fish. This heretofore unobtainable result is achieved by providing a single, one-piece V-shaped fishing lure body longitudinally tapering from front to rear, with a forward extending upwardly turned lip positioned at the head of the fishing lure, and a rearwardly extending upwardly turned tail portion formed at the rear of the fishing lure.

The fishing lure of the present invention also accommodates a plurality of different sized form-fitting weights. Each weight is preferably shaped to engageably nest directly in the "V" of the fishing lure body, extending substantially the entire length of the fishing lure. In this way, both the center of gravity and the distribution of weight is optimized for the desired bait fish simulating action. Also, the accommodation of the weights in the fishing lure itself eliminates the need for line-mounted sinkers.

It has been found that the forwardly extending upwardly turned lip at the head of the fishing lure and the rearwardly extending upwardly turned tail portion at the rear of the fishing lure combine with the longitudinally tapered rearwardly V-shaped body of the fishing lure in a synergistic manner to provide a fishing lure having a continuous zig-zag side-to-side rolling motion, simulating the movement of a live bait fish and, in particular, simulating the movement of a wounded bait fish.

As mentioned above, the inwardly facing surfaces of V-shaped body of the fishing lure of the present invention is preferably adapted to cooperate with a plurality of different weights in order to securely, nestably retain the weights therein. Preferably, each lead weight incorporates a single vertically extending through hole substantially midway along the longitudinal axis of the weight which accommodates the fastening means and which cooperates with the base of the fishing lure. In this way, any desired weight can be inserted into the facing surfaces of the V-shaped body of the fishing lure to provide a fishing lure having the desired mass for any particular situation.

The invention accordingly comprises a product possessing the features, properties, and relation of components which will be exemplified in the product hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 1 is an exploded perspective view of one embodiment of a fishing lure of the present invention;

FIG. 2 is a side elevation view of the fishing lure of the present invention shown in water with a trailing hook system mounted to the rear end thereof;

FIG. 3 is a top plan view of the fishing lure of the present invention with the form-fitting weight removed;

FIG. 4 is a bottom view of the fishing lure of the present invention;

FIG. 5 is a cross-sectional elevation view of the fishing lure of the present invention taken along line 5—5 of FIG. 2;

FIGS. 6 and 7 are cross-sectional elevation views of the fishing lure of the present invention similar to FIG. 5 with alternative weights shown therein;

FIG. 8 is a top plan view of another embodiment of the fishing lure of the present invention;

FIG. 9 is a front elevation view of the fishing lure of FIG. 8; and

FIG. 10 is a side elevation view of the fishing lure of FIG. 8.

For convenience of understanding, the same reference numerals are employed to refer to the same elements throughout the several views of the drawings.

DETAILED DESCRIPTION

Referring to FIGS. 1-7, one embodiment of the live bait simulating fishing lure 20 of the present invention is shown. In this embodiment, fishing lure 20 comprises a substantially V-shaped body 22, which longitudinally tapers rearwardly, a forward prow portion 23, and upwardly forwardly extending lip 24 formed at the head of lure 20, and a rearwardly upwardly extending tail portion 25. In this embodiment, fishing lure 20 accommodates a weight member 26 which is removably positionable within V-shaped body 22 and secureable therein by fastening means 27.

Fishing lure 20 comprises an overall length of about 5 inches. Although a five inch length has been found to be effective in capturing both medium and large size fish, any alternative length could be employed without departing from the scope of this invention. Also, fishing lure 20 is preferably manufactured from metal, such as stainless steel. Stainless steel is preferred for its resistance to the corrosion of salt water, but any other suitable metal can be employed, such as aluminum or magnesium. If metals, other than stainless steel, or plastics are used for fishing lure 20, it is preferable to plate the lure with any one of a variety of metals, such as chrome, in order to impart corrosion resistance to the lure. Furthermore, the external surfaces of V-shaped body 22 comprise shiny, reflective surfaces, in order to attract the game fish, as is fully discussed below, and this surface is best achieved with a bright plating or with stainless steel.

By referring to the drawings, particularly FIGS. 1, 3 and 4, it is best seen that V-shaped body 22 incorporates two longitudinally extending, downwardly converging side walls 28 and 29. Both side walls 28 and 29 are longitudinally tapered rearwardly, terminating with upwardly rearwardly extending tail portion 25 in a smooth, rounded filleted corner 35. Furthermore, side walls 28 converge at the at the base of fishing lure 20 with a smooth blended curved edge 36 forming the base of V-shaped body 22 of fishing lure 20.

Side walls 28 and 29 longitudinally extend forwardly to their terminating edge 37 with prow portion 23. As with the other edges discussed above, edge 37 comprises a smooth, rounded, filleted corner. In this way, the water flow along the sides is controlled and the potential occurrence of undesirable turbulence, as fishing lure 20 moves through the water, is reduced.

Upwardly, forwardly extending lip 26 joins prow portion 23 at smoothly rounded corner 38, and incorporates a ring engaging hole 39, to which suitable attachment means for the fishing line can be made. As shown in FIG. 2, ring 41 is mounted through hole 39 with fishing line 40 attached to ring 41. In this way, fishing lure 20 is securely attached to fishing line 40 for complete control thereof.

As shown throughout the drawings, tail portion 25 incorporates a slot 42 for accommodating the secure attachment of any type of desired hook system to the tail of fishing lure 20. In the preferred embodiment, a solid, twist-open ring 43 is employed with the trailing hook system 30 attached to ring 43, as shown in FIG. 2.

Twist-open ring 43 is a butt-type ring having two opposed curved portions 44 and 45 which are interconnected by substantially straight leg portions 61 and 62. Leg portion 61 incorporates a slot opening formed therein, substantially mid-way along leg portion 61.

Although any ring can be employed, ring 43 is preferred since its construction maintains hook system 30 spaced away from lure 20 in engagement with curved portion 45, while opposed curved portion 44 remains in engagement with slot 42 of tail 25. Also, ring 43 is easily twisted open and closed in order to place any desired camouflaged hook system 30 on fishing lure 20, as well as remove the hook system when the game fish has been captured.

Slot 42 of tail portion 25 preferably comprises an elongated slot in order to provide camouflage hook system 30 with sufficient flexibility and maneuverability as fishing lure 20 moves through the water. This freedom of movement is important for both attracting the game fish as well as landing the game fish while the game fish attempts to free himself after being engaged on the hook.

The inside surfaces of side walls 28 and 29 along with the inside surface of prow 23 and the inside surface of tail portion 25 establish a holding zone 30. Holding zone 30 is employed for nested secure retention of weight member 26, shown in FIG. 1. Weight member 26 is employed to provide fishing lure 20 with a weighted mass as a substantially integral part of the lure itself. In this way, the maneuverability of lure 20 is not in any way hampered and lure 20 is able to freely roll, twist and wag from side to side, simulating live bait fish, without being hampered by line-mounted sinkers.

Since the typical fisherman employs a variety of techniques, such as casting, trolling, or jigging, fishing lure 20 of the present invention is constructed to be universally applicable to substantially every potential technique as well as any water depth which may be encountered. Its universality is provided by employing a plurality of different sized weight members which are removably secureable in holding zone 30 of fishing lure 20. In this way, the effective mass of fishing lure 20 can be altered, as desired, in order to achieve the exact fishing lure weight required for any particular situation. Of course, if desired, lure 20 can be employed without any weight member at all.

In FIGS. 1 and 2, weight member 26 is shown secured in holding zone 30 by use of fastening means 27. Although any suitable fastening means can be employed, it has been found that screw means 27, which is threadedly engaged with hole 48 formed in edge 36 of V-shaped body 22, is the least expensive for this repetitive use. Although screw means 27 is preferred, it is obvious to one skilled in the art that any desired fastening system can be employed in order to securely retain weight member 26 in holding zone 30 of fishing lure 20 without departing from the scope of this invention.

As shown in FIGS. 1 and 5, weight member 26 comprises a size and shape which is precisely fitted to holding zone 30. In this way, maximum area usage is achieved as well as center of gravity control and equal weight distribution throughout the entire length of fishing lure 20.

In order to achieve the universality provided by fishing lure 20 of the present invention, weight member 26, which represents a 4.5 ounce weight, is one of a plurality of different weight members which can be securely nestingly engaged in cavity 30 of fishing lure 20. As shown in FIGS. 6 and 7, additional weight members 46 and 47 are shown in nested engagement in cavity 30 of fishing lure 20. In these pictorial illustrations, weight member 46 comprises a smaller weighted mass (about 2.5 ounces), than member 26, while weight member 47 comprises the smallest weighted mass of all three (about one ounce). However, any one of a plurality of different masses and shapes can be employed without departing from the scope of this invention.

Once fishing lure 20 of the present invention has been secured to fishing line 40, any water depths, as well as any techniques employed by the fisherman can be accommodated by merely changing the particular weight member. In order to remove a weight member contained in holding zone 30 of fishing lure 20, fastening means 27 are threadedly disengaged from hole 48 and a different weight member inserted in holding zone 30 and secured therein by fastening means 27. In this simple, rapid, easily achieved manner, fishing lure 20 can be converted to any desired weight in order to accommodate the variety of conditions and techniques.

By providing the form fitting, nested engagement of weight members 26, 46 or 47 along substantially the entire length of V-shaped body 22, a universally applicable fishing lure is achieved. By merely changing the weight member, fishing lure 20 is rapidly converted into any required mass ready to provide its rolling, wagging, undulating movements, completely unencumbered by line-mounted sinkers. Also, this form-fitted construction is important in order to provide fishing lure 20 with a weight distribution and a center of gravity which will achieve the desired live bait simulating action. Consequently, although some variation may be made in the precise positioning of weight members, it is preferred that the weight members are in nested engagement along the base of V-shaped body 22, with additional contact with walls 28 and 29 being made depending upon the particular size of the weight member being employed.

Another important feature of the fishing lure of the present invention is the upwardly, forwardly extending lip 24 and the upwardly, rearwardly extending tail portion 25. In the preferred embodiment, lip 24 extends upwardly at an angle of about 20 degrees from the horizontal, while tail portion 25 extends upwardly at an angle of about 30 degrees from the horizontal. Although these angular relationships are preferred and have been found to produce the best results, lip 24 can be between about 5 and 45 degrees with tail portion 25 being between about 10 and 50 degrees. The angular pitch of lip 24 and tail portion 25 are important since they interact with V-shaped body 22, prow 23, and the lure's inherent low center of gravity to achieve the live bait fish simulating movement desired to attract the game fish.

Since fishing lure 20 has been constructed for capturing both medium and large sized fish, the most normal fishing techniques which would be employed by the fisherman are retrieval of the fishing lure after casting, trolling from behind a moving boat, or jigging in deep water from an anchored boat or from a wharf. With these techniques in mind, fishing lure 20 has been constructed to maximize the visibility of the fishing lure while also attracting the game fish to the fishing lure due to the live bait fish simulating movements of fishing lure 20. Furthermore, the construction of fishing lure 20 substantially eliminates spinning, planing to the top, or completely sinking to the bottom.

The upwardly, forwardly extending lip 24 and upwardly, rearwardly extending tail portion 25 in combination with prow 23, V-shaped body 22, and the low center of gravity provided by the form-fitting weight members and the lure body shape all cooperate with the forces of the water acting on these surfaces as lure 20 is drawn through the water to establish an undulating, wagging, side-to-side rolling action. Since surfaces 28 and 29 of V-shaped body 22 are preferably highly reflective, the side-to-side rolling action also achieves a continuous flashing action. Also, with surfaces 28 and 29 comprising a major portion of lure 20, the flashing action is very pronounced, rendering fishing lure 20 highly visible to game fish.

It is believed that as lip 24 attempts to minimize its surface area which is cutting through the water, fishing lure 20 is caused to roll to one side. Then, the forces of the water on tail portion 25, along with the low center of gravity of fishing lure 20 and the water forces impacting upon prow 23, all contribute to force fishing lure 20 to roll from this first side to its other side, with edge 36 downwardly pivoting.

Once fishing lure 20 has rolled to its second side, the same actions occur causing lure 20 to roll from the second side back to its first side. This side-to-side rolling movement is continuously repeated with surfaces 28 and 29 continuously flashing as the sunlight is reflected therefrom.

This side-to-side rolling action is extremely important since it produces an action which closely simulates the movements of a wounded bait fish. It is well known that large and medium sized game fish feed on the smaller fish, with a wounded fish being the primary target of these larger preying fish, since a wounded fish presents little resistance or difficulty for a rapid capture. Consequently, the wounded bait fish simulating movements of fishing lure 20, with its continuous, highly visible flashing feature, provides extremely important game fish attracting actions which enhance the desired capture of the game fish.

In FIGS. 8, 9 and 10, an alternative body of the fishing lure of the present invention is shown. In this embodiment, fishing lure 50 comprises body portion 52, lip portion 54 and tail portion 55. Body portion 52 incorporates two transversely flat surfaces 58 and 58, which are highly reflective in the preferred embodiment.

Lip 54 is angularly disposed and forwardly extending from the front of body portion 52, while tail portion 55 is also angularly disposed and extends rearwardly from the back of body portion 52. Lip portion 54 forms an obtuse angle with adjacent surface 58 of body portion 52. The angle is generally about 150 degrees, which also represents a 30 degree angular relationship with the horizontal. Although this 30 degree (150 degree) angular construction is preferred, lip portion 54 may have an angle of between about 10 and 50 degrees with the horizontal (120–170 degrees with surface 58) while still performing in accordance with the teaching of the present invention.

In the preferred embodiment, tail portion 55 extends rearwardly from adjacent surface 58 of body portion 52 at an obtuse angle thereto of about 165 degrees. This also represents a 15 degree angular relationship of tail portion 55 with the horizontal. Although the 15 degree (165 degree) angle is preferred, tail portion 55 can be made with an angular relationship of between about 10 degrees and 30 degrees from the horizontal (150-170 degrees with surface 58) without departing from the teaching of the present invention.

Fishing lure 50 also incorporates a ring engaging hole 56 formed in lip 54 and a hook system engaging hole 57 formed in tail portion 55. In this way, fishing lure 50 can be easily attached to the end of the fishing line ready to perform its live bait fish simulating actions in order to attract small game fish.

In operation, lip 54 and tail portion 55 operate in a similar manner as described above in reference to fishing lure 20 continuously rolling from side-to-side with the transversely flat, longitudinally tapering rearwardly highly reflective surfaces 58 and 59 of body portion 52 providing the light reflection. Although lip 54 and tail portion 55 provide the similar function in fishing lure 50 as the similar portions perform in fishing lure 20 described above, fishing lure 50 has been found to be most efficiently employed with lip portion 54 and tail portion 55 extending downwardly as the lure is pulled through the water. In this way, lip portion 54, tail portion 55 and body portion 52 all cooperate to provide the side-to-side rolling action desired. Furthermore, the weight of the hook system extending from tail portion 55 adds additional downwardly directed forces to maintain and promote the side-to-side rolling action inherent in the movement of fishing lure 50.

As can be seen from the preceding description, the fishing lure of the present invention provides a fishing lure concept useable for small, medium and large size fish which simulates the movements of live bait fish and in particular simulates side-to-side rolling action of a wounded bait fish. Since all preying game fish instinctively strike at wounded bait fish, the live bait fish simulating action of the fishing lure of the present invention is extremely important in enticing game fish to strike at this fishing lure over all other potential meals within their view. Furthermore, the bright, light reflective surfaces which continuously flash as the lure rolls from side to side provides an added advantage in attracting the game fish.

Although some of the elements forming the fishing lure of the present invention are known in the prior art, these elements are combined with new elements which interact synergistically to achieve a resulting lure which greatly exceeds a mere sum of its parts.

Also, even though the constructions of the embodiments of the fishing lure of the present invention have been fully detailed above, various obvious changes may be incorporated into these constructions using the teaching herein or prior art knowledge. Consequently, it is to be understood that all such variations are within the scope of this invention.

It will thus be seen that the objects set forth above, among those made apparent from the preceding description, are efficiently attained and, since certain changes may be made in the above product without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A live bait fish simulating fishing lure, for use with a conventional fishing line, comprising:
   (A) a central body portion incorporating two substantially flat surfaces, with both surfaces longitudinally tapering rearwardly;
   (B) a lip portion
      (a) forwardly extending from the front of the body portion at an angle thereto,
      (b) lying in a first plane, and
      (c) incorporating an aperture formed therein for engagement with the fishing line and controlled movement of the fishing lure therewith; and
   (C) a tail portion
      (a) rearwardly extending from the end of the body portion at an angle thereto,
      (b) lying in a second plane the extension of which intersects the extension of the first plane along a line located between the lip portion and the tail portion, and
      (c) incorporating an aperture formed therein for engagement of a hook assembly therewith, thereby providing a fishing lure capable of controlled side-to-side, rolling movement, simulating the movement of a live bait fish, as the fishing lure is drawn through the water.

2. The live bait fish simulating fishing lure defined in claim 1, wherein the two flat surfaces of the body portion are downwardly converging at a common lower edge, forming a substantially V-shape.

3. The live bait fish simulating fishing lure defined in claim 1, wherein the two flat surfaces of the body portion comprise transversely flat planar surfaces in spaced parallel relationship.

4. The live bait fish simulating fishing lure, for use with a conventional fishing line, comprising:
   (A) a substantially V-shaped body portion incorporating two substantially flat side walls, said side walls
      (a) longitudinally tapering rearwardly,
      (b) downwardly converging at a single longitudinally extending lower edge, and
      (c) forming a substantially V-shaped cavity between the facing surfaces of the side walls;
   (B) a forwardly projecting lip portion
      (a) extending from the leading edge of the substantially V-shaped body,
      (b) lying in a first plane, and
      (c) incorporating an aperture formed therein for controlled engagement with the fishing line; and
   (C) a rearwardly projecting tail portion
      (a) extending from the rear edge of said substantially V-shaped body portion,
      (b) lying in a second plane the extension of which intersects the extension of the first plane along a line located between the lip portion and the tail portion, and
      (c) incorporating an aperture formed therein for engagement of a hook assembly therewith, thereby providing a fishing lure capable of rolling from side to side as the lure is drawn through the water.

5. The live bait fish simulating fishing lure defined in claim 4, wherein said side walls of said V-shaped body comprise substantially flat, parallel, upper and lower surfaces.

6. The live bait fish simulating fishing lure defined in claim 5, wherein at least said lower surfaces are light reflective.

7. The live bait fish simulating fishing lure defined in claim 4, further comprising:
(D) an upwardly forwardly inclined prow surface transversely extending between the forward edge of the two side walls forming the substantially V-shaped body portion, and
(E) the lip portion is further defined as forwardly projecting upwardly from the top edge of the prow portion.

8. The live bait fish simulating fishing lure defined in claim 7, wherein said fishing lure is formed from a single metal stamping.

9. The live bait fish simulating fishing lure defined in claim 7, wherein said tail portion is further defined as transversely extending upwardly between the rear edges of the side walls forming the substantially V-shaped body.

10. The live bait fish simulating fishing lure defined in claim 9, wherein said fishing lure comprises smooth, rounded filleted corners along all mating surfaces.

11. The live bait fish simulating fishing lure defined in claim 4, wherein said forwardly projecting lip portion extends upwardly from the horizontal at an angle of between about 5 and 45 degrees, and said tail portion rearwardly projects upwardly from the horizontal at an angle of between 10 and 50 degrees.

12. The live bait fish simulating fishing lure defined in claim 11, wherein said lip portion extends upwardly from the horizontal at an angle of 20 degrees and said tail portion extends upwardly from the horizontal at an angle of about 30 degrees.

13. The live bait fish simulating fishing lure defined in claim 4, wherein said fishing lure further comprises:
(D) a weight member removably nestably engageable in the cavity formed between the side walls of said substantially V-shaped body portion.

14. The live bait fish simulating fishing lure defined in claim 13, wherein a plurality of different size weight members are nestably engageable in the cavity, with each of said weight members having a substantially V-shaped lower surface for nesting engagement along the base of the substantially V-shaped cavity.

15. The live bait fish simulating fishing lure defined in claim 13, further comprising:
(E) fastening means securely engaging said weight member with said body portion.

16. The live bait fish simulating fishing lure defined in claim 4, wherein said tail portion further comprises an elongated slot and an elongated oval-shaped clip member slidably mounted within said slot.

17. The live bait fish simulating fishing lure defined in claim 4, wherein said fishing lure comprises a length to width to depth ratio of 10 to 1.5 to 1, thereby providing a fishing lure having a low center of gravity.

18. The live bait fish simulating fishing lure defined in claim 4, wherein said fishing lure incorporates
(D) a ring member comprising
(a) two opposed facing curved portions,
(b) two substantially straight leg portions interconnecting the curved portions, and
(c) an opening slot formed in one of said leg portions.

19. The live bait fish simulating fishing lure defined in claim 1, wherein said forwardly projecting lip portion extends at an angle of between about 5 and 50 degrees from the horizontal, and said tail portion projects rearwardly from the horizontal at an angle of between about 10 and 50 degrees.

20. The live bait fish simulating fishing lure defined in claim 19, wherein said lip portion extends from the horizontal at an angle of between about 20 and 30 degrees and said tail portion extends from the horizontal at an angle of between about 15 and 30 degrees.

* * * * *